United States Patent Office 3,466,336
Patented Sept. 9, 1969

3,466,336
POLYTHIOETHERS DERIVED FROM ACETYLENIC COMPOUNDS AND H₂S
Wolfgang H. Mueller, Elizabeth, and Alexis A. Oswald, Mountainside, N.J., assignors to Esso Research and Engineering Company, a corporation of Delaware
No Drawing. Filed Apr. 6, 1966, Ser. No. 540,483
Int. Cl. C07c *149/12*
U.S. Cl. 260—609      9 Claims

ABSTRACT OF THE DISCLOSURE

A process for preparing terminally difunctional polythioether polyadducts having a minimum of six repeating units useful in mastic compositions which comprises reacting hydrogen sulfide with at least an equimolar amount of an acetylene in the liquid phase. Dependent on the excess of acetylene over hydrogen sulfide, the polymers contain thiol and/or vinyl end groups.

---

The present invention relates to low molecular weight polythioether products, a selective free radical promoted process for their formation and to cured mastic compositions formed from said polymers. More particularly, the present invention is directed to low molecular weight polythioether products formed by the selective free radical promoted reaction of hydrogen sulfide with an acetylenic compound and to cured vulcanizates formed from said polythioethers.

The reaction of hydrogen sulfide with an acetylenic compound has been reported in the literature. For example, Stacey and Harris, J.A.C.S., 85, 963 (1963), reported the addition reaction of hydrogen sulfide with methylacetylene in a nonagitated system. The authors reported using methylacetylene and H₂S in a 1:2 molar ratio and X-rays as the reaction initiator. Under these conditions, the reaction was not selective and the researchers secured 1-propene-1-thiol, 1,2-propane dithiol and polymeric material in a weight ratio of 1:1.6:1 at very low conversions. The polymeric by-products obtained by Stacey and Harris, because of the conditions at which the experiment was conducted, were materials having molecular weights below 350 which correspond to no more than 4–5 repeat units per polymeric molecule.

It is therefore, an object of this invention to provide a selective process for the formation of polythioether addition products having number average molecular weights in excess of 350.

Now in accordance with the present invention, it has been found that polythioether addition products having number average molecular weights varying from about 350 to 25,000 can be formed by the free radical addition of hydrogen sulfide to acetylenic compounds. It has been discovered that to achieve high yields of high molecular weight polymeric product, it is necessary to react from about 1 to 2 moles of acetylenic compound per mole of hydrogen sulfide. The polythioether products of this invention are characterized by either thiol or vinyl terminal functionality and as a result can be readily cross-linked to soft elastomeric and plastic-like vulcanizates using conventional techniques.

The over-all reaction contemplated by this invention may be represented by the following equations:

(I) 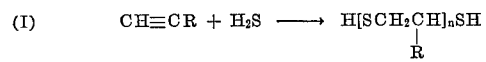

(II) 

(III) 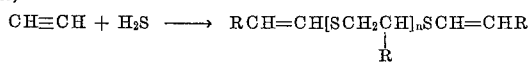

The product of Equation I is the predominant product recovered when equal molar amounts of hydrogen sulfide and acetylenic compound are reacted. However, minor amounts of the products of Equations II and III are also secured with an equimolar reaction. The vinyl terminated products of Equations II and III occur as the predominant product when from about 1.1 to 2 moles of acetylenic compound is reacted per mole of H₂S. Additionally, it has been found that when from 5 to 10 moles of H₂S is reacted per mole of acetylenic compound, 1,2-propane dithiol in approximately 80% yield at complete conversion is recovered. With this reaction, the remaining portion of the reaction product usually consists of polymeric material having molecular weights below about 350.

The value of $n$ can vary over a wide range. As stated previously, the number of repeat units present in the polymeric molecule and hence the molecular weight as well as the percent conversion of the reactants to high molecular weight polymeric products is strongly dependent upon the amounts of hydrogen sulfide and acetylenic compound reacted. Generally, the value of $n$ varies between 6 and 100, preferably between 6 and 25. Products finding the greatest utility as the base constituent for mastic compositions exhibit $n$ values varying from about 6 to 25. The products of this invention are colorless liquids or low melting solids having number average molecular weights varying from 350 to 25,000, preferably between 600 and 1800.

The acetylenic compounds utilized as starting materials in the process have the general formula:

$$CH \equiv CR$$

wherein R may be a hydrogen radical or a $C_1$ to $C_{30}$ organic radical and combinations thereof. Preferably the organic radical is a $C_1$–$C_{30}$ alkyl group; e.g. methyl, ethyl, butyl, etc., or a $C_7$ to $C_{30}$ aralkyl group; e.g. benzyl, tolyl, mesityl, etc. Although any of the above-named materials can be used, it is especially preferred that R be a $C_{10}$ group or lower, especially a $C_1$ to $C_4$ alkyl group.

As stated previously, the ratio of acetylenic compound to H₂S compound reacted has a strong effect both on the molecular weight of the polymeric product and also upon the degree of conversion of the reactants to polymeric products. If from 1 to 2 moles of acetylenic compound is reacted per mole of H₂S, from 50 to 100%, more generally from 70 to 100% yields of desirable high molecular weight polymeric products are secured at complete conversion of the reactants. In commercial operations, the total amount of reactants may be introduced into the reaction zone at the same time or alternatively, the acetylenic compound may be added incrementally to the hydrogen sulfide reactant present in the reaction zone until the required amount of acetylene compound is introduced.

The reaction for the production of the polythioether polymers of this invention can be carried out in bulk or in the presence of inert diluents. Polythioether compounds having from 6 to 25 repeat units per polymer molecule can be prepared most efficiently using bulk polymerization techniques, that is, carrying out the addition reaction in the absence of solvents. However, the addition reaction may also be carried out in the presence of inert solvents. Useful inert solvents include saturated aliphatic hydrocarbons, halogenated saturated aliphatic hydrocarbons, aliphatic ethers, and aliphatic thioethers such as pentane, cyclohexane, dimethyl sulfide, diethyl sulfide, etc.

The conditions at which the addition reaction is carried out can vary over a wide range; however, the temperature and pressure at which the reaction is conducted should be adjusted such that the hydrogen sulfide and acetylenic compound are in the liquid state during reaction. For bulk addition reactions, temperatures varying from —100° to 175° C., preferably —30° to 140° C. can be used. When the polythioethers are formed in the presence of a solvent, temperatures varying from —30 to 140° C. preferably from 0 to 50° C. are used.

The pressure at which the addition reaction is conducted is not critical provided that the reaction pressure is sufficient to maintain the reactants in the liquid state at the temperature of reaction. In general, pressures ranging from 0.5 to 50 atm. preferably from 1 to 30 atm., can be used. In most industrial applications the pressure within the reaction zone will normally be the autogenous pressures exerted by the reactants.

The reaction time used in the formation of the polymers of this invention is not critical; however, sufficient time should be allowed for the desired monomer conversion which depends upon temperature, reactant concentration, activity of catalyst used, etc. In general, high yields of polythioethers are secured within the temperature and pressure limits set forth above within from 1 to 300 hours.

While not absolutely essential to the process, it is desirable to promote the addition reaction with a free radical initiator. Radiation such as ultraviolent light, gamma-radiation, or heat may be applied to the reactants to catalyze the reaction. Additionally, chemical initiators such as peroxides, azo compounds, etc., may also be used instead of radiation or in combination with it. When chemical initiators are employed, from 0.0005 to 0.1 mole of initiator are used per mole of reactants.

Ultraviolet radiation is the prefered initiator for this process although peroxidic initiators such as t-butyl hydroperoxide, bis-t-butyl peroxide, as well as materials such as bis-azobutyronitrile may also be used.

The reaction vessel utilized for the addition reaction can be constructed of any material that is inert to the reactants and catalysts used and is capable of withstanding the operating pressure. Reaction vessels made of stainless steel and glass-lined steel are satisfactory.

Although the addition products of the present invention have many varied uses as intermediates because of the thiol or vinyl terminal functionality present on the polymers, they find particular utility as the base constituent for mastic compositions. The thiol terminated addition products can be readily cross-linked to stable rubbery or plastic three-dimensional networks using a variety of techniques. For example, the addition products can be chain extended by mixing the polymer with from 1 to 20 grams per 100 grams of polymer of dimethylsulfoxide and heating the total mixture at a temperature varying from 80 to 150° for a period ranging from 1 to 5 hours. Similarly, the thiol terminated products can be cured by mixing the polymer with an epoxide compound having at least 2 epoxide groups per molecule and heating the mixture in the presence of an amine catalyst for a time sufficient to secure a cured network. Alternatively, these polymeric dithiols may be cured with diisocyanates to produce polythiourethanes. Due to their reactive thiol terminals, they can be also reacted with diacrylates, allylic acrylates, divinyl sulfone and other reactive diolefinic compounds.

Reactions of the polymer of this invention with trifunctional or polyfunctional molecules lead to three-dimensional polymer networks. For example, the thiol terminated polymers of this invention may be reacted with polybutadiene or the copolymer of butadiene and styrene such as the polymers described in U.S. Patents Nos. 2,712,562, 2,791,618, 2,849,510 and 2,826,618 and the like. In reverse, the polythioethers having vinyl sulfide end groups can be reacted with tri- and/or polythiols such as the thrithiolic ester derived from mercaptopropionic acid and trimethylolpropane.

Prior to curing operation, the addition products may be compounded with stabilizers, plasticizers or extender oils, and various types of fillers. For example, carbon black, petroleum coke or mineral fillers may be incorporated into the polymer up to about 10 parts, preferably up to 200 parts, of filler per 100 parts of polymer. Among the carbon blacks that may be compounded with the polythioethers are the channel blacks such as ETC, MPC, HPC, etc. (these letters denoting carbon black products are well known to the trade), the furnace blacks including SRF, HAF, etc. and thermal blacks. Useful mineral fillers include the oxides, sulfides, hydroxides, carbonates, etc. of silicon, aluminum, magnesium, titanium, zinc or the like, or the silicates or aluminates of the various elements above mentioned.

The cured compositions of this invention are highly resistant to ozone and oxygen degradation even at elevated temperatures and are not readily degraded through contact with organic solvents. Hence the cured materials find particular utility in automotive applications and as gasketing materials.

The invention will be further understood by reference to the following examples. In each example either a normally liquid acetylene compound was introduced to or a gaseous acetylene compound was condensed into a Dry Ice-cooled evacuated quartz tube equipped with a magnetic stirring bar and a Teflon valve. The tube was then cooled in liquid nitrogen and $H_2S$ condensed into it and subsequently sealed.

The sealed tube was then irradiated under autogenous pressure with magnetic stirring in a water bath maintained at 17±3°. The irradiation was carried out with a 70 w. high pressure Hanau mercury immersion lamp. Irradiation times ranged from 15 to 50 hrs. and are specified in the individual reactions. After completion of the irradiation, the unreacted gases were released and the mixtures sampled for N.M.R. analysis. In the cases of selective polythioether syntheses the remaining material was heated for 3–4 hrs. at 130–140° C. and 0.02 mm. of mercury pressure to remove any volatile materials. These consisted of a mixture of the corresponding monomeric dithiol and some low molecular weight thioethers (g.l.c. analysis) amounting, in general, to 10–15 percent of the total weight. From the residual polythioethers N.M.R. spectra and number average molecular weight ($\overline{M}_n$) were obtained.

EXAMPLE 1

Methylacetylene (8 g., 0.2 m.) and 68 g. (2 m.) of $H_2S$ were irradiated for 15 hrs. according to the general procedure. After release of the excess $H_2S$ 18 g. of a yellow liquid product mixture was obtained. The major product, 11.6 g. (78 percent yield), was found to be 1,2-propanedithiol. Its N.M.R. spectrum and g.l.c. retention time were identical with those of an authentic sample. The residue from distillation was a mixture of higher adducts.

This experiment demonstrates that if the molar ratio of $H_2S$ to acetylene compound exceeds 1:1 monomeric dithiol is formed rather than low molecular weight polymers.

EXAMPLE 2

Methylacetylene (40 g., 1 m.) and 34 g. (1 m.) of $H_2S$ were irradiated for 29.5 hrs. according to the general procedure. After removal of the volatiles, 65.18 g. of a pale yellow, viscous liquid of $\overline{M}_n$ 638 was obtained. The N.M.R. spectrum of this polythioether showed no unsaturation.

EXAMPLE 3

Methylacetylene (43 g., 1.075 m.) and 33.8 g. (0.994 m.) of $H_2S$ were irradiated for 44 hours according to the general procedure. After removal of the volatiles 70 g. of a colorless, viscous polythioether of $\overline{M}_n$ 1780 was obtained. N.M.R. analysis showed no unsaturation.

EXAMPLE 4

Methylacetylene (12 g., 0.3 m.) and 5.9 g. (0.174 m.) of $H_2S$ were irradiated for 16 hours according to the general procedure. The polymeric residue (11.1 g.) had an $\overline{M}_n$ of 1161 and showed unsaturation on N.M.R. analysis.

EXAMPLE 5

To 15 g. of a polythioether of $\overline{M}_n$ 638 (Example 2) 5 g. of methylacetylene were added and the mixture irradiated for 40 hours according to the general procedure. After removal of the unreacted methylacetylene, a yellow, viscous liquid of $\overline{M}_n$ 990 was obtained. Its N.M.R. spectrum indicated terminal unsaturation.

EXAMPLE 6

Butyl acetylene (1-hexyne) (90 g., 1.1 m.) and $H_2S$ (34 g., 1.0 m.) are irradiated together according to the general procedure for 35 hours. The polymeric residue is a higher addition product having an $\overline{M}_n$ of about 2000.

EXAMPLE 7

$H_2S$ (28 g., 0.82 m.) and 3-phenyl-1-propyne (110 g., 0.95 m.) are irradiated according to the general procedure for 26 hours. The polymeric product recovered is a material having an $\overline{M}_n$ of about 2400.

EXAMPLE 8

One part by weight of the polymer of Example 2 and one part by weight of a diepoxide compound, bisphenol-A glycidyl ether are mixed and heated to 190° F. for 30 minutes. The resulting product is a plastic-like material. A portion of the vulcanizate is immersed in excess cyclohexane and permitted to stand at room temperature for 24 hours. As a result of solvent immersion, the vulcanizate is swollen to only a minor extent indicating a high crosslink density and good solvent resistance of the cured product.

What is claimed is:

1. A polythioether addition product comprising compounds having the general formula selected from the group consisting of:

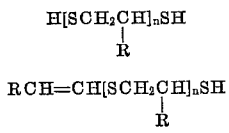

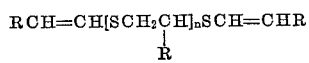

and

RCH=CH[SCH₂CH]ₙSCH=CHR
              |
              R wherein R is selected from the group consisting of hydrogen, $C_1$–$C_{30}$ alkyl radicals, $C_7$–$C_{30}$ aralkyl organic radicals and mixtures thereof; and $n$ varies from 6 to 100.

2. A process for the formation of polythioethers which comprises reacting, in the liquid phase $H_2S$ with an acetylenic compound of the general formula CH≡CR, wherein R is $C_1$–$C_{30}$ alkyl or $C_7$–$C_{30}$ aralkyl radicals, the molar ratio of acetylenic compound reacted with $H_2S$ varying from about 1:1 to 2:1, at a temperature in the range of from −30 to 140° C. for a time sufficient to recover a reaction product having the general formula selected from the group consisting of:

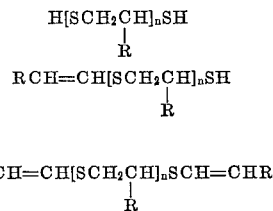

and

RCH=CH[SCH₂CH]ₙSCH=CHR
              |
              R wherein $n$ varies from 6 to 100.

3. The process of claim 2 wherein said acetylenic compound is methylacetylene.

4. The process of claim 2 wherein the reaction is carried out in an inert solvent.

5. The process of claim 2 wherein said reaction is initiated with a free radical catalyst.

6. The process of claim 5 wherein R is hydrogen.

7. The process of claim 5 wherein R is an alkyl radical having from 1 to 4 carbon atoms.

8. The process of claim 5 wherein said free radical catalyst is ultraviolet light.

9. The process of claim 5 wherein from 50 to 90 wt. percent of the reaction product consists of a polythioether having the general formula selected from the group consisting of:

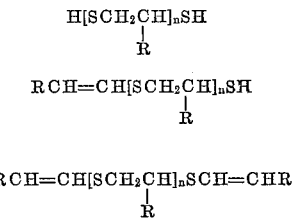

and

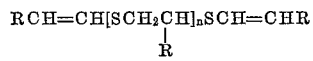

and mixtures thereof wherein $n$ varies from 6 to 100.

References Cited

UNITED STATES PATENTS

| | | | |
|---|---|---|---|
| 3,337,487 | 8/1967 | Vandenberg | 260—79 |
| 3,325,456 | 6/1967 | Adame et al. | 260—79.7 |

OTHER REFERENCES

Stacey et al.: "J.A.C.S.," vol. 85, pp. 963–965 (1963).
Strausz et al.: "Can. Jou. Chem.," pp. 717–721, vol. 43 (1965).
Houben-Weyl: "Met der Org. Chem.," vol. 9, p. 120 (1955).

CHARLES B. PARKER, Primary Examiner

D. R. PHILLIPS, Assistant Examiner

U.S. Cl. X.R.

204—162; 260—41, 47, 79.3, 79.7, 879, 880